3,313,763
FIRE RETARDANT POLYMER COMPOSITIONS HAVING IMPROVED THERMAL PROPERTIES
Stephen M. Creighton, Edmonton, Alberta, Canada, and Edward V. Gouinlock, Jr., Buffalo, N.Y., assignors to Hooker Chemical Corporation, Niagara Falls, N.Y., a corporation of New York
No Drawing. Filed May 27, 1963, Ser. No. 283,570
38 Claims. (Cl. 260—41)

This invention relates to novel fire retardant polymer compositions, and to methods for rendering polymeric materials fire retardant.

Polymeric materials are being used more widely every year in industrial applications such as wire coatings, pipes and conduits and for other industrial molded materials and extruded products. These and other uses are better served by polymer compositions that are fire retardant and flame resistant and sometimes such products must be fire retardant to be of utility in particular applications. Prior art attempts to impart fire resistance to polymers by the use of additives have often adversely affected some desirable properties of the polymers to which they were added.

Now additives have been found which significantly reduce the flammability of polymeric materials, even making them non-burning. Additionally, these fire retardant additives for polymeric materials also enhance and/or preserve other physical properties of the polymer.

In accordance with this invention there is provided a fire retardant polymer composition comprising (1) a polymer of an unsaturated hydrocarbon, and (2) a compound selected from the group consisting of (a) 1,2-dihydro - 3,6-methano-3,4,5,6,7,7-hexachlorophthalimide, (b) 2,2',3,3',4,4',5,5',7,7,7',7' - dodecachloro-1',2,2',5,5',6,6'-octahydro-2,2',5,5'-methanobiphenyl, (c) tetrachlorophthalimide and mixtures thereof. The flame retardant characteristics of these polymer compositions are further improved by incorporating antimony compounds therein. Such compositions are found to have enhanced physical properties, such as heat distortion temperature, over the properties of the base resin.

The polymers embraced within the scope of this invention are the homopolymers and copolymers of unsaturated aliphatic, alicyclic, and aromatic hydrocarbons. Suitable monomers are ethylene propylene, butene, pentene, hexene, heptene, octene, 2-methylpropene-1, 3-methylbutene-1, 4-methylpentene-1, 4-methylhexene-1, 5-methylhexene-1, bicyclo - (2.2.1)-2-heptene, butadiene, pentadiene, hexadiene, isoprene, 2,3-dimethylbutadiene-1, 3,2-methylpentadiene-1,3, 4-vinylcyclohexene, vinylcyclohenexe, cyclopentadiene, styrene and methylstyrene and the like.

Two of the polymers of this group, polyethylene and polystyrene, have long been known in the art. Low-density (0.92 gram/cc.) polyethylene is produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcett et al., Chem. Abs., 32, 1362 (1938).

Polystyrene is readily produced by mass, solution or emulsion polymerization as described in The Technology of Plastics and Resins, Mason, J. P. and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

In recent years a new field of linear and stereoregular polymers has become available which are suitable for use in this invention. These polymers are produced with organometallic catalysts and supported metal oxide catalysts as disclosed in great detail in Linear and Stereoregular Addition Polymers: Polymerization With Controlled Propagation, Gaylord, N. G. and Mark, F. H., Interscience Publishers, Inc. (1959). Monomers of the type disclosed hereinbefore are readily polymerized to solid polymers in the presence of a catalyst system comprising aluminum triethyl and titanium tetrachloride or titanium trichloride. The reaction is carried out in the presence of an inert, hydrocarbon diluent, suitably purified of catalyst poisons, at a temperature in the range of fifty to two hundred and thirty degrees centigrade. At the conclusion of the reaction, the polymer can be recovered from the resulting solution or suspension by evaporation of the diluent, whereupon the polymer is treated for removal of catalyst residues, for example by washing with water or alcohol, and acids. Metal oxide catalysts such as chromium oxide supported on silica or alumina are suitable for polymerizing 1-olefins containing a maximum of eight carbon atoms, with no branching closer to the double bond then the 4-position. The polymerization is carried out in the manner described for the organometallic catalyst system.

The preparation of 1,2 - dihydro - 3,6 - methano - 3,4,5,6,7,7-hexachlorophthalimide is disclosed in an article by McBee, Journal American Chemical Society, volume 77, at pages 493 and 494. This imide may be prepared by heating equal molar proportions of chlorendic anhydride and ammonium carbonate monohydrate in a closed container until fusion occurs. After cooling, the fused mixture is dissolved in boiling xylene and the carbonaceous matter is filtered off. The filtered solution is then concentrated to about half its volume and the 1,2,-dihydro - 3,6-methano-3,4,5,6,7,7-hexachlorophthalimide crystallizes out upon cooling. The crystals are recovered by filtration. For convenience the amide will be referred to by its empirical formula ($C_9H_3O_2Cl_6N$). This compound melts at approximately 280 degrees centrigrade.

The preparation of 2,2',3,3',4,4',5,5',7,7,7',7' - dodecachloro - 1,1',2,2',5,5',6,6' - octahydro - 2,2',5,5' - methanobiphenyl is disclosed in United States Patent 2,606,910 issued Aug. 12, 1952. For convenience this compound will be referred to by it empirical formula ($C_{14}H_6Cl_{12}$). $C_{14}H_6Cl_{12}$ is prepared by condensing 2 moles of hexachlorocyclopentadiene with one mole of 1,3 butadiene at a temperature below 200 degree centigrade and thereafter recrystallizing the reaction product from isopropyl alcohol. This compound melts at about 232 degrees centigrade.

The preparation of tetrachlorophthalimide is disclosed in an article by D. S. Pratt and G. A. Perkins, Journal American Chemical Society, volume 40 at page 205. Tetrachlorophthalic anhydride is dissolved in hot formamide and then the tetrachlorophthalimide is allowed to crystallize out of the mother liquor. The crystals are recovered by standard filtration techniques. For convenience, the tetrachlorophthalimide will be referred to by its empirical formula ($C_8HO_2Cl_4N$). This compound melts at about 340 degrees centigrade.

The relatively high melting points and low vapor pressures of the above fire retardant compounds confer an unusual degree of permanency of the fire protection imparted to polymeric compositions by their use. Many previously known fire retarding compounds with high chlorine contents either melted at low temperatures and caused the polymer to drip or flow, due to lower heat distortion temperatures and greater fluidities, or possessed a high vapor pressure and readily volatilized from the polymer composition, or did both. The incorporation of the mentioned fire retardant compounds into polymeric compositions according to the present invention creates useful articles suitable for use at higher temperatures and for longer periods of time than was formerly possible.

Antimony oxide is the antimony compound that is presently preferred for incorporation in preferred embodiments of the present invention. However, many other antimony compounds are useful with the oxide or in its stead. Some such inorganic antimony compounds include antimony sulfide, sodium antimonite, potassium antimonate, and the like. Many organic antimony compounds are suitable, such as the antimony salts of organic acids and their pentavalent derivatives disclosed in United States Patent 2,996,528, issued Aug. 15, 1961. Likewise, the esters of antimonous acids and their pentavalent derivatives, as disclosed in U.S. Patent 2,993,924, issued July 25, 1961, are useful additives. The corresponding arsenic and bismuth compounds can also be employed.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state at temperatures that can range from the melting point to the decomposition temperature of the polymer. Alternatively, the additives and polymer are dry-blended in the finely divided state so that an intimate mixture is obtained upon subsequent molding or extrusion.

Example 1

A sample of polypropylene prepared by organometal-catalyzed polymerization of propylene was heated in the roller head of a Brabender Plastograph for about five minutes at two hundred to two hundred and five degrees centigrade and then was discharged into a mold. The compression molded specimen had a heat distortion temperature of seventy-nine degrees centigrade under a stress of 212 pounds per square inch and burned at a rate of 1.3 inches per minute.

Example 2

Seventy parts by weight of the type of polypropylene used in Example 1 were mixed with thirty parts of $C_9H_3O_2Cl_6N$ in the roller head of the Plastograph for eight minutes at two hundred degrees centigrade and then was discharged into a mold. The resulting compression molded specimen had a heat distortion temperature of ninety-four degrees centigrade under a stress of 212 pounds per square inch and burned slowly at 0.50 inch per minute.

Example 3

Seventy parts by weight of the polypropylene of Example 1 were mixed with twenty parts of $C_9H_3O_2Cl_6N$ and ten parts of antimony oxide, using the conditions of Example 1. The resulting compression molded specimen had a heat distortion temperature of ninety-six degrees centigrade under a stress of 212 pounds per square inch and was self-extinguishing in five seconds.

In the manner of Example 3, $C_{14}H_6Cl_{12}$ and $C_8HO_2Cl_4N$ were also incorporated into various portions of polypropylene as follows:

| Example | Fire Retardant | | $Sb_2O_3$ (Wt. percent) | Heat Distortion Temp (° C.) | Burning Characteristics |
|---|---|---|---|---|---|
| | Compound | (Wt. percent) | | | |
| 4 | $C_{14}H_6Cl_{12}$ | 20 | 10 | 89 at 212 p.s.i. | Self-extinguishing in 8 seconds. |
| 5 | $C_8HO_2Cl_4N$ | 20 | 10 | 84 at 212 p.s.i. | Burning at 0.64 in./min. |
| 6 | $C_8HO_2Cl_4N$ | 26.6 | 13.4 | | Burning at 0.60 in./min. |

The fire retardant compounds of the instant invention are desirably incorporated in polymer materials in the range from about five to about fifty percent by weight of the polymer composition, preferably from about ten to about thirty-five percent by weight. The antimony compound can be used in amounts ranging from less than one to about thirty percent by weight of the polymer composition, preferably from about five to about twenty percent by weight.

The invention is illustrated by the following examples which are not intended to limit the scope of the invention.

In these examples, the properties of the molded polymer compositions were tested in accordance with standard American Society for Testing Materials (ASTM) test procedures as follows:

Heat distortion temperature—ASTM D648–56 (using 212 pounds per square inch fiber stress)
Burning characteristics—ASTM D635–56T In the latter test, a specimen can fall into one of three categories: (1) Burning (the rate is reported), (2) self-extinguishing upon removal of flame and (3) non-burning. In these examples, the length of time the specimens burned after the flame was removed is reported. Usually a range for several specimens is given.

In the following examples, $C_8HO_2Cl_4N$ was incorporated in linear polyethylene produced by polymerizing ethylene in the presence of a supported chromium oxide catalyst. The mixing method was the same as in the preceding examples except that the mixing temperature was one hundred and sixty-five degrees centigrade.

| Example | $C_8HO_2Cl_4$ (Wt. percent) | $Sb_2O_3$ (Wt. percent) | Burning Characteristics |
|---|---|---|---|
| 7 | 20 | 10 | Self-extinguishing in 18–123 seconds. |
| 8 | 26.6 | 13.4 | Burning at 0.57 inch/min. |
| 9 | None | None | Burning at 0.69 inch/min. |

Polystyrene and the other recited plastics, when admixed with the fire retardant additives according to this invention, following the procedures illustrated, also exhibit improved resistance to heat distortion and burning. Specifically, polystyrene, substituted for the polyethylene and polypropylene of Examples 2–5, also shows improved thermal and fire resistant properties.

In the foregoing examples, 0.25 milliliter dibutyltin dilaurate was used as a heat stabilizer. It was found that this additive did not affect the properties other than appearance. It is also within the scope of the invention to use other heat stabilizers such as basic lead phosphite, basic lead carbonate and the like. Likewise other additives such as carbon black, colored pigments and the like can be utilized without departing from the spirit of the invention.

From the examples it is evident that the incorporation of the fire retardant compounds of this invention into hydrocarbon polymers imparts fire retardance to the polymer by slowing the burning rate in all cases, and by rendering the polymers self-extinguishing at the higher concentrations. The fire retardant characteristics of the compositions are further enhanced by also incorporating an antimony compound therein.

It was unexpected to find that the incorporation of the materials of the instant invention into polymers enhanced their thermal properties, as exemplified by improved heat distortion temperatures, whereas it would normally be expected that such characteristics would be adversely affected. Additionally, it was found that the compositions of the invention have less tendency to drip when contacted by a flame, thereby further reducing the hazard of using hydrocarbon polymers in industrial applications where the spreading of burning molten material can be a serious problem in the event of a fire.

Various changes and modifications may be made in the method and apparatus of the invention, certain preferred forms of which have been herein described, without departing from the spirit and scope of the present invention.

What is claimed is:

1. A fire retardant polymer composition comprising (1) a polymer of an unsaturated hydrocarbon, and (2) a compound selected from the group consisting of (a) 1,2-dihydro-3,6-methano-3,4,5,6,7,7 - hexachlorophthalimide, (b) tetrachlorophthalimide and mixtures thereof.

2. A fire retardant composition according to claim 1 wherein compound (2) comprises from 5 to 50 percent by weight.

3. A fire retardant polymer composition according to claim 1 wherein compound (2) comprises from 10 to 35 percent by weight.

4. A fire retardant polymer composition comprising a polymer of an unsaturated hydrocarbon and 1,2-dihydro-3,6-methano-3,4,5,6,7,7-hexachlorophthalimide.

5. A composition according to claim 4 wherein the polymer is polyethylene.

6. A composition according to claim 4 wherein the polymer is polypropylene.

7. A composition according to claim 4 wherein the polymer is polystyrene.

8. A fire retardant polymer composition comprising a polymer of an unsaturated hydrocarbon and tetrachlorophthalimide.

9. A composition according to claim 8 wherein the polymer is polyethylene.

10. A composition according to claim 8 wherein the polymer is polypropylene.

11. A composition according to claim 8 wherein the polymer is polystyrene.

12. A fire retardant polymer composition comprising (1) a polymer of an unsaturated hydrocarbon, (2) a compound selected from the group consisting of (a) 1,2-dihydro-3,6-methano-3,4,5,6,7,7-hexachlorophthalimide, (b) tetrachlorophthalimide and mixtures thereof, and (3) an antimony compound.

13. A composition according to claim 12 wherein the antimony compound is antimony oxide.

14. A fire retardant polymer composition according to claim 12 wherein compound (2) comprises from 5 to 50 percent by weight and the antimony compound comprises from 1 to about 30 percent by weight.

15. A fire retardant polymer composition according to claim 12 wherein compound (2) comprises from 10 to about 35 percent by weight and the antimony compound comprises from about 5 to about 20 percent by weight.

16. A composition according to claim 13 wherein compound (2) is 1,2-dihydro-3,6-methano-3,4,5,6,7,7-hexachlorophthalimide.

17. A composition according to claim 13 wherein compound (2) is tetrachlorophthalimide.

18. A composition according to claim 13 wherein the polymer is polyethylene.

19. A composition according to claim 13 wherein the polymer is polypropylene.

20. A composition according to claim 13 wherein the polymer is polystyrene.

21. A composition according to claim 15 wherein compound (2) is 1,2-dihydro-3,6-methano-3,4,5,6,7,7-hexachlorophthalimide.

22. A composition according to claim 15 wherein compound (2) is tetrachlorophthalimide.

23. A composition according to claim 22 wherein the polymer is polyethylene.

24. A composition according to claim 22 wherein the polymer is polypropylene.

25. A composition according to claim 22 wherein the polymer is polystyrene.

26. A composition according to claim 21 wherein the polymer is polyethylene.

27. A composition according to claim 21 wherein the polymer is polypropylene.

28. A composition according to claim 21 wherein the polymer is polystyrene.

29. A fire retardant polymer composition comprising (1) a polymer of an unsaturated hydrocarbon and (2) 2,2',3,3',4,4',5,5',7,7,7',7'-dodecachloro 1,1',2,2',5,5',6,6'-octahydro-2,2',5,5'-methanobiphenyl.

30. A composition according to claim 29 wherein the polymer is polyethylene.

31. A composition according to claim 29 wherein the polymer is polypropylene.

32. A composition according to claim 29 wherein the polymer is polystyrene.

33. A fire retardant polymer composition comprising (1) a polymer of an unsaturated hydrocarbon, (2) 2,2',3,3',4,4',5,5',7,7,7',7'-dodecachloro 1,1',2,2',5,5',6,6'-octahydro-2,2',5,5'-methanobiphenyl.

34. A composition according to claim 33 wherein the antimony compound is antimony oxide.

35. A fire retardant polymer composition according to claim 33 wherein compound (2) comprises from 10 to about 35 percent by weight, and the antimony compound comprises from about 5 to about 20 percent by weight.

36. A composition according to claim 35 wherein the polymer is polyethylene.

37. A composition according to claim 35 wherein the polymer is polypropylene.

38. A composition according to claim 35 wherein the polymer is polystyrene.

References Cited by the Examiner

UNITED STATES PATENTS

| | | | |
|---|---|---|---|
| 2,606,910 | 8/1952 | Herzfeld et al. | 260—342.2 |
| 3,158,588 | 11/1964 | Johnson | 260—45.75 |
| 3,158,638 | 11/1964 | Hoch. | |

MORRIS LIEBMAN, *Primary Examiner.*

J. S. WALDRON, *Assistant Examiner.*